Oct. 29, 1935. T. WOODALL 2,018,988
MUSIC RACK
Filed Aug. 20, 1934
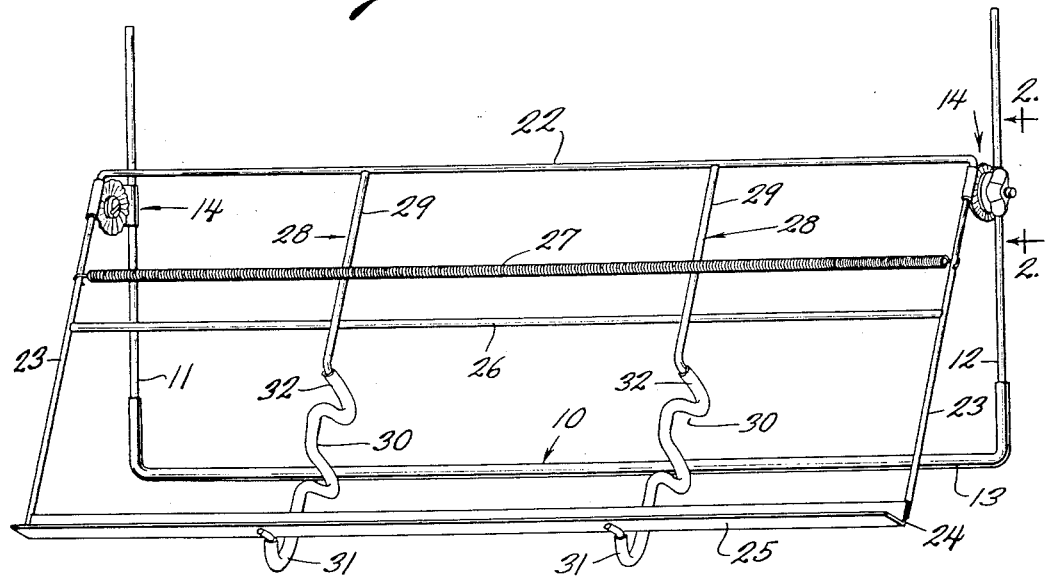
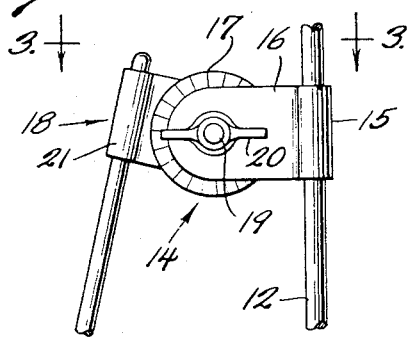
Inventor:
Thomas Woodall Patented Oct. 29, 1935

2,018,988

UNITED STATES PATENT OFFICE 2,018,988

MUSIC RACK

Thomas Woodall, Chicago, Ill.

Application August 20, 1934, Serial No. 740,590

4 Claims. (Cl. 45—82)

This invention relates to a rack for music or the like and has to do with improved structural features in the rack and in its supporting member.

The objects of the invention include, among others, the provision of the following:

A music rack that is adjustable over a wide range without disturbing its stability;

A unique music rack which is securely anchored upon a piano in all positions of adjustment and which will not mar or scratch the piano; and Unique means for improving the adjustability of a music rack or the like.

These objects, and such other objects as may hereinafter appear, are obtained by the unique construction, improved combination, and novel arrangement of the several elements which constitute the invention, one form of which is illustrated in the accompanying single sheet of drawing hereby made a part of this application, and in which:

Figure 1 is a perspective of an embodiment of the present invention;

Figure 2 is a detail in elevation of the rack adjusting means;

Figure 3 is a plan view of the parts of the device shown in Figure 2; and

Figure 4 is a schematic detail indicating in full lines one position of the device upon a piano, and in dotted lines a second position to which the rack may be adjusted thereon.

Like reference characters are used to designate similar parts in the drawing and in the description of the illustrated embodiment of the invention which follows.

The device comprises a support member and a rack. The support member is U-shaped and has a transverse section 10 and legs 11 and 12. The transverse section 10 may be covered with a tubing 13, which may extend upwardly on the legs 11 and 12 to provide protection to furniture.

Upon each of the legs 11 and 12 is a clamp member 14 which comprises a sleeve 15 extending about the leg 11 or leg 12. An apertured extension 16 is at one side of said sleeve, and a second apertured extension 17 depends from the other side of said sleeve. Section 17 may be toothed.

Each bracket 14 has attached thereto a bracket 18 which is complementally toothed for engaging the teeth of section 17. Bracket 18 is also apertured to receive a bolt 19 having on the shank thereof a wing nut 20, the bolt extending through bracket 18 and wings or sections 16 and 17 of bracket 14. At the adjacent side of the bracket 18 is a sleeve 21. Loosening of the wing nut 20 permits of the bracket 14 being moved up and down on the leg 11 or leg 12, and also permits of an angular adjustment of the two bracket members, 14 and 18.

The rack is secured in the sleeve 21. The rack is fastened by any suitable means, as by soldering, welding, or otherwise. The rack comprises a top cross member 22, two side members 23 which are the parts secured in the sleeves 21 and which are parallel, and a bottom member 24 which is parallel to the top cross or transverse member 22. Parts 22, 23, and 24, may be integral and in the form of a rectangle.

An angle iron 25 may be secured by fastening means or by solder or welding to part 24. The angle iron 25 comprises a support for music, a newspaper, a magazine, or a book, which is disposed upon the rack.

Brace member 26 is disposed intermediate the side members 23, and a weak spiral spring 27 is stretched between said side members and anchored thereon. The spring provides a paper or music holder. Music rests against brace 26 and may also rest against member 22.

Piano engaging members 28 comprise an upper straight section 29, a stepped intermediate section 30, and a forwardly projecting front section 31. Members 28 are soldered or otherwise secured to member 22 and brace member 26. The forwardly projecting extension 31 registers with but is not secured to the angle piece 25, the front portion of such forwardly projecting section not extending beyond the front of said angle piece.

Protective sleeves 32 are telescoped over the members 28 and extend upwardly thereon above the section 30 thereof, said sleeves 32 being held against slippage by the frictional contact thereof with the underside of the angle piece 25.

The adjustment of the device has heretofore been described. Whatever position the device may take, it is supported by two spaced apart protected members, the member 10 or the members 28. If the device is used upon a table, it is spread apart as an inverted V with the member 10 to the rear and the members 28 supporting the device at the front.

On a grand piano, the U-shaped member 10 is disposed upon the music rack of the piano and by adjustment the proper height for the rack is obtained. One of the steps in stepped sections 30 rests upon the edge of the piano at the front thereof and just above the keyboard is shown in Figure 4.

The device, as shown in Figure 4, may be adjusted by lifting the rack to a higher position or to a lower position. In this manner, the rack may be disposed at the best reading distance for the user of the piano. The rack is particularly suited for children who normally have difficulty in reading music upon the conventional rack of the grand piano.

On an upright piano, the rack is similarly disposed, the steps in section 30 of the members 28 resting upon the edges of the music rack and the member 10 resting against the back of the music rack in the same oblique position which said rack occupies.

What is claimed as new and is desired to be secured by Letters Patent of the United States is:

1. A music rack comprising a U-shaped support, a rack, angularly adjustable connecting means for mounting said rack on said support, said angularly adjustable connecting means being linearly adjustable upon said U-shaped support, and tightening means associated with said angularly adjustable connecting means for maintaining the angular and linear adjustment thereof.

2. A music rack comprising a U-shaped support, a clamp about each of the legs of said U-shaped support and slidable thereon, brackets complemental to said clamps and angularly adjustable with relation thereto, a rack carried by said brackets, and tightening means associated with said clamps and brackets for maintaining a selected angular adjustment thereof and for securing said clamps upon said support.

3. In a music rack, a frame having paired opposed bar side members, supporting members secured to one side member of said frame and depending beneath the opposite side member of said frame, and protective sleeves upon said supporting members and held in position by engagement with said last mentioned side member.

4. A music rack comprising a rear support, a rack adjustable thereon, said rack comprising a rectangular frame of paired opposed bar members, front supporting members secured to the top side member of said frame and in frictional contact with the lower side member thereof, and protective sleeves upon said front supporting members and held in position thereon by said lower side member.

THOMAS WOODALL.